United States Patent Office 2,942,037
Patented June 21, 1960

2,942,037

PRODUCTION OF CHLOROPRENE

Philip Aldwyn Jenkins, Ashtead, England, assignor to The Distillers Company Limited, Edinburgh, Scotland, a British company No Drawing. Filed Nov. 18, 1958, Ser. No. 774,601

Claims priority, application Great Britain Nov. 28, 1957

4 Claims. (Cl. 260—655)

The present invention relates to the production of chloroprene, and in particular to the production of chloroprene by the dehydrochlorination of 3:4-dichlorbutene-1.

The production of chloroprene by heating 3:4-dichlorbutene-1 with an aqueous solution of an alkali is well known. Hitherto, difficulty has been experienced in operating the process, particularly in a continuous manner, owing to the formation of polymeric and resinous material, which rapidly blocks up the apparatus. This polymeric material, which has a rubbery texture, is particularly difficult to remove since it is insoluble in solvents, and its formation necessitates the frequent dismantling of the plant to remove it.

It is an object of the present invention to provide an improved process for the production of chloroprene, in which the formation of polymeric and resinous material is very greatly reduced.

According to the present invention, the process for the production of chloroprene by heating 3:4-dichlorbutene-1 with an aqueous solution of an alkali is characterised in that the reaction is carried out in the presence of a substance furnishing sulphide ions.

In this specification the term "sulphide ion" includes both sulphide and hydrosulphide ions.

The presence of a substance furnishing sulphide ions in the reaction medium effectively inhibits the formation of polymeric material and as a result the operation of the process is greatly facilitated. The substance is preferably an alkali metal sulphide such as sodium or potassium sulphide, and it is preferred to use sodium sulphide. Alkali metal hydrogen sulphides and alkaline earth metal sulphides such as calcium sulphide may also be used.

If desired the sulphide may be added in the form of a complex with an alkyl halide such as 3:4-dichlorbutene-1.

Formation of the undesirable polymeric material is effectively inhibited by the presence of very small quantities of the aforementioned sulphides. We have found that concentrations of as little as about 0.1 to 5.0% by weight of sulphide based on the volume of the reaction medium are suitable, with no apparent advantage at this time to be gained by employing more than about 1%. The reaction is preferably carried out by introducing the 3:4-dichlorbutene-1 into a solution of the alkali such as a 5 to 20% aqueous sodium hydroxide solution containing an alkali metal sulphide, preferably with stirring or agitation. The solution is maintained above the boiling point of chloroprene, i.e. about 60° C., which is distilled off as it is formed. Instead of sodium hydroxide, other alkali metal hydroxides such as potassium hydroxide may be used as dehydrochlorinating agents, or alkaline earth metal hydroxides such as calcium or barium hydroxides.

The following examples are given further to illustrate the process of the invention. In the present application it is to be understood that parts by weight and parts by volume bear the same relation to each other as do kilograms of water to litres of water. Accordingly it is possible to specify percent by weight of inhibitor based on the volume of the reaction mixture.

EXAMPLE 1

100 parts by volume of 10% sodium hydroxide solution together with 0.492 parts by weight of sodium sulphide ($Na_2S.9H_2O$) was placed in a reaction vessel fitted with nitrogen inlet and reflux condenser, the outlet of the condenser being fitted with a water trap to prevent entrance of air. 25 parts by volume of 3:4-dichlorbutene-1 were added down the condenser under a blanket of nitrogen. The mixture in the flask was then heated under gentle reflux for three hours to convert the dichlorbutene to chloroprene. The reaction mixture was then allowed to cool to room temperature and was filtered. The residual material on the filter paper, after washing with water and light petroleum (40–60° C.) and drying, amounted to 0.05 part by weight of chloroprene polymer.

The process was repeated using the potassium sulphide of the present invention and conventional chloroprene polymerization inhibitors, and in each case the weight of polymer remaining on the filter paper was taken as a measure of the efficiency of the inhibitors. The results are shown in Table 1.

*Table 1*

| Inhibitor | Amount of inhibitor added, parts by weight | Polymer formed, parts by weight |
|---|---|---|
| Sodium sulphide ($Na_2S.9H_2O$) | 0.492 | 0.05 |
| Potassium sulphide | 0.25 | 0.04 |
| t-Butyl catechol | 0.253 | 1.232 |
| Thiodiphenylamine | 0.266 | 0.98 |
| Anthracene | 0.025 | (1) |
| Pyrogallol | 0.252 | 0.58 |

[1] Practically complete polymerization.

EXAMPLE 2

500 parts by weight of 10% sodium hydroxide solution were placed, together with the sodium sulphide in a reaction vessel, and nitrogen was passed through the agitated mixture for one hour to remove oxygen. The temperature of the mixture was then raised to 83–86° C. and 125 parts by weight of 3:4-dichlorbutene-1 were added over approximately 30 minutes, while chloroprene was distilled out of the reaction vessel. The temperature was finally raised to 103° to complete the removal of volatile organic matter after which the vessel contents were cooled and filtered to determine the degree of polymer formation.

The weights of residual polymer and the effective reduction in polymer formation using different concentrations of inhibitor are shown in Table 2.

*Table 2*

| Inhibitor | Parts by weight of inhibitor added | Parts by weight of polymer formed | Percent reduction in polymer formation |
|---|---|---|---|
| None | | 1.015 | |
| Sodium sulphide ($Na_2S.9H_2O$) | 1.25 | 0.179 | 82.5 |
| Sodium sulphide ($Na_2S.9H_2O$) | 0.5 | 0.179 | 82.5 |

I claim:

1. A process for the production of chloroprene which comprises heating 3:4-dichlorbutene-1 with an aqueous solution of alkali in the presence of a substance furnishing sulphide ions selected from the group consisting of alkali metal and alkaline earth metal sulphides and alkali metal hydrogen sulphides.

2. A process as set forth in claim 1 wherein the concentration of the substance furnishing sulphide ions is between about 0.1 and 5% by weight based on the volume of the reaction mixture.

3. A process as set forth in claim 1 wherein the concentration of the substance furnishing sulphide ions is between about 0.1 and 1% by weight based on the volume of the reaction mixture.

4. A process for the production of chloroprene which comprises heating 3:4-dichlorbutene-1 with an aqueous solution of alkali above the boiling point of chloroprene in the presence of sodium sulphide.

References Cited in the file of this patent

UNITED STATES PATENTS

| | | |
|---|---|---|
| 1,950,438 | Carothers et al. | Mar. 13, 1934 |
| 2,136,334 | Coleman et al. | Nov. 8, 1938 |
| 2,407,396 | Brubaker | Sept. 10, 1946 |
| 2,430,016 | Hearne et al. | Nov. 4, 1947 |